US010536850B2

(12) United States Patent
Wu

(10) Patent No.: US 10,536,850 B2
(45) Date of Patent: Jan. 14, 2020

(54) REMOTE WIRELESS ADAPTER

(71) Applicant: Fortinet, Inc., Sunnyvale, CA (US)

(72) Inventor: Jianfeng Wu, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 1335 days.

(21) Appl. No.: 13/945,104

(22) Filed: Jul. 18, 2013

(65) Prior Publication Data
US 2015/0026768 A1 Jan. 22, 2015

(51) Int. Cl.
*H04L 29/00* (2006.01)
*H04W 12/06* (2009.01)
*H04W 12/02* (2009.01)
*H04L 29/06* (2006.01)

(52) U.S. Cl.
CPC ........... *H04W 12/06* (2013.01); *H04L 63/029* (2013.01); *H04L 63/08* (2013.01); *H04W 12/02* (2013.01)

(58) Field of Classification Search
CPC ..................................................... H04W 12/02
See application file for complete search history.

(56) References Cited

U.S. PATENT DOCUMENTS

| 8,804,696 | B1* | 8/2014 | Krishnamurthy et al. ... 370/352 |
| 2008/0270186 | A1* | 10/2008 | Mikkelsen .......... G06F 19/3456 705/3 |
| 2012/0151098 | A1* | 6/2012 | Sullivan ................ G06F 1/1607 710/13 |
| 2012/0275303 | A1* | 11/2012 | Wang .................... H04L 12/287 370/230 |

* cited by examiner

Primary Examiner — Brandon S Hoffman
Assistant Examiner — Helai Salehi
(74) Attorney, Agent, or Firm — Jaffery Watson Mendonsa & Hamilton, LLP

(57) ABSTRACT

Systems and methods are described for connecting a private network to the Internet through a remote wireless adapter. According to one embodiment, a remote wireless adapter sets up a tunnel with a network security device through a local area network (LAN) adapter of the remote wireless adapter and sets up a wide area network (WAN) connection through a wireless modem which is connected to the wireless adapter. The remote wireless adapter receives an outgoing data packet sent by the network security device through the tunnel and writes the outgoing data packet to the WAN connection. The remote wireless adapter also receives an incoming data packet through the WAN connection and forwards the incoming data packet to the network security device through the tunnel.

28 Claims, 15 Drawing Sheets

REMOTE WIRELESS ADAPTER

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2013, Fortinet, Inc.

BACKGROUND

Field

Embodiments of the present invention generally relate to the field of computer networking techniques. In particular, various embodiments relate to methods and systems for connecting a private network to the Internet through a remote wireless adapter.

Description of the Related Art

Nowadays, it is crucial for a company to maintain a reliable connection to the Internet without any disruption. A private network of a company usually has more than one connection to the Internet so that a failover connection may maintain connectivity to the Internet when a primary Internet connection has failed.

FIG. 1 illustrates a typical prior art network architecture with wireless failover connections. As shown in FIG. 1, network security device 120 has LAN port 124 which is used for connecting a local network. Network security device 120 has WAN port 123 which is connected to cable modem 122 which is usually provided by an Internet Service Provider (ISP). Cable modem 122 is used for connecting the local network to the Internet 150 through the ISP. Network security device 120 also has 3G/4G modems 125 and 126 as failover connections. 3G/4G modems 125 and 126 may be a Universal Serial Bus (USB) dongles that are inserted into USB port of Network security device 120. When the primary Internet connection is lost as a result of a problem with cable modem 122 or the ISP, 3G/4G modem 125 or 126 may connect to the Internet 150 through a 3G/4G cellular network. To use the 3G/4G cellular network connection, 3G/4G modems 125 and 126 need to be in an area that is covered by the cellular network signal. Usually, 3G/4G modems 125 and 126 should be installed at a place where the 3G/4G signal is strong, such as a place near a window of a building. However, network security device 120 is usually installed in a computer room that is located inside a building where 3G/4G signal may be weak or blocked by walls of the building. 3G/4G modems 125 and 126 which are directly inserted into USB ports of network security device 120 may have a weak connection or no connection when network security device 120 needs the 3G/4G connection.

To improve the 3G/4G connection, remote wireless adapters have been introduced so that a 3G/4G USB wireless modem may be connected to the network security device remotely. As shown in FIG. 1, remote wireless adapter 110 has 3G/4G modems 112 and 113 and Ethernet port 111. Remote wireless adapter 110 may be placed at a remote place from network security device 120 where 3G/4G signal is stronger than the 3G/4G signal observed at the location of network security device 120. Network security device 120 and remote wireless adapter 110 are connected through a cable between WAN port 121 of network security device 120 and Ethernet port 111 of remote wireless adapter 110. Remote wireless adapter 110 is another router besides cable modem 122. Public IP addresses assigned to the 3G/4G modems 112 and 113 by 3G/4G cellular network are sent to network security device 120. When the primary Internet connection of cable modem 122 is down, network security device 120 forwards all outgoing traffic to its WAN port 121. The outgoing traffic is then forwarded to the Internet through 3G/4G modems 112 and 113 of remote wireless adapter 110.

Although remote wireless adapter 110 can be installed in a remote place from network security device 120, it is connected directly to network security device 120 through a cable and must be within the same network segment. The location of remote wireless adapter 110 is thus limited by the length of the cable. A direct physical connection is also not flexible for installation.

SUMMARY

Systems and methods are described for connecting a private network to the Internet through a remote wireless adapter. According to one embodiment, a remote wireless adapter sets up a tunnel with a network security device through a local area network (LAN) adapter of the remote wireless adapter and sets up a wide area network (WAN) connection through a wireless modem which is connected to the wireless adapter. The remote wireless adapter receives an outgoing data packet sent by the network security device through the tunnel and writes the outgoing data packet to the WAN connection. The remote wireless adapter also receives an incoming data packet through the WAN connection and forwards the incoming data packet to the network security device through the tunnel.

According to another embodiment, a network security device sets up a tunnel with a remote wireless adapter through a network interface of the network security device. The network security device receives an outgoing data packet from a local network appliance and forwards the outgoing data packet to the remote wireless adapter through the tunnel. The network security device also receives an incoming data packet through the tunnel and routes the incoming data packet to a local area network (LAN) interface.

Other features of embodiments of the present invention will be apparent from the accompanying drawings and from the detailed description that follows.

BRIEF DESCRIPTION OF THE DRAWINGS

Embodiments of the Present Invention are Illustrated by Way of Example, and not by Way of Limitation, in the Figures of the Accompanying Drawings and in which Like Reference Numerals Refer to Similar Elements and in which.

DETAILED DESCRIPTION

Figure 1:
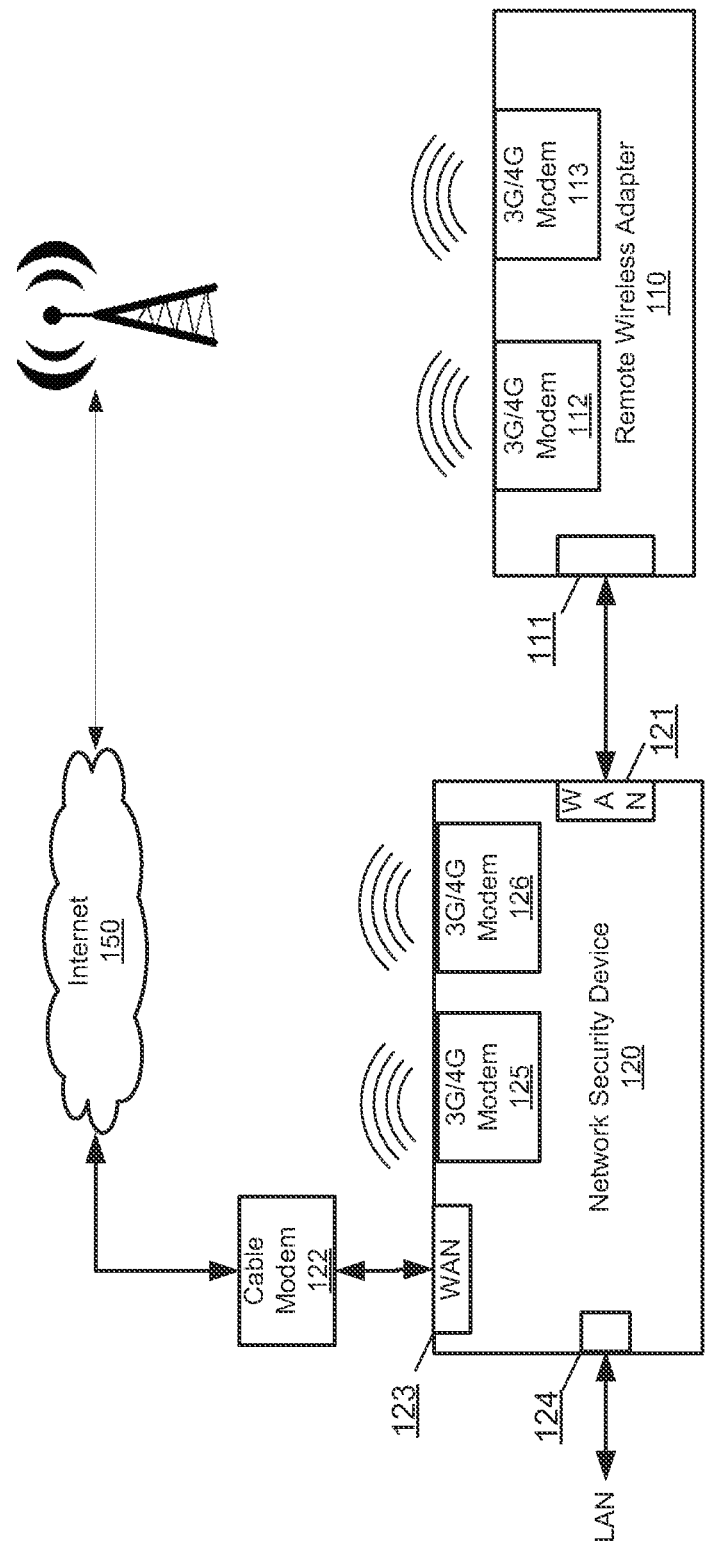
FIG. 1 illustrates a typical prior art network architecture with wireless failover connections.

Systems and methods are described for connecting a private network to the Internet through a remote wireless adapter. According to one embodiment, the remote wireless adapter can be placed anywhere within a network to which the network security device is connected. In one embodiment, the remote wireless adapter does not require any configuration by a user of the remote wireless adapter and may transmit network traffic to a network security device in a secure way. A tunnel may be established between a network security device of the private network and the remote wireless adapter so that outgoing traffic of the private network may be sent to the remote wireless adapter by the network security device through the tunnel. The outgoing traffic of the private network is then sent to the Internet through a cellular network by a 3G/4G modem of the remote wireless adapter. Incoming traffic received by the 3G/4G modem of the remote wireless adapter is forwarded to the network security device by the remote wireless adapter through the tunnel. The remote wireless adapter may be a primary or failover connection of the private network.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The phrase "network security device" generally refers to a hardware device or appliance configured to be coupled to a network and to provide one or more of data privacy, protection, encryption and security. The network security device can be a device providing one or more of the following features: network firewalling, Virtual Private Networking (VPN), antivirus, intrusion prevention (IPS), content filtering, data leak prevention, antispam, anti spyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, VPN, IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

Figure 2A:
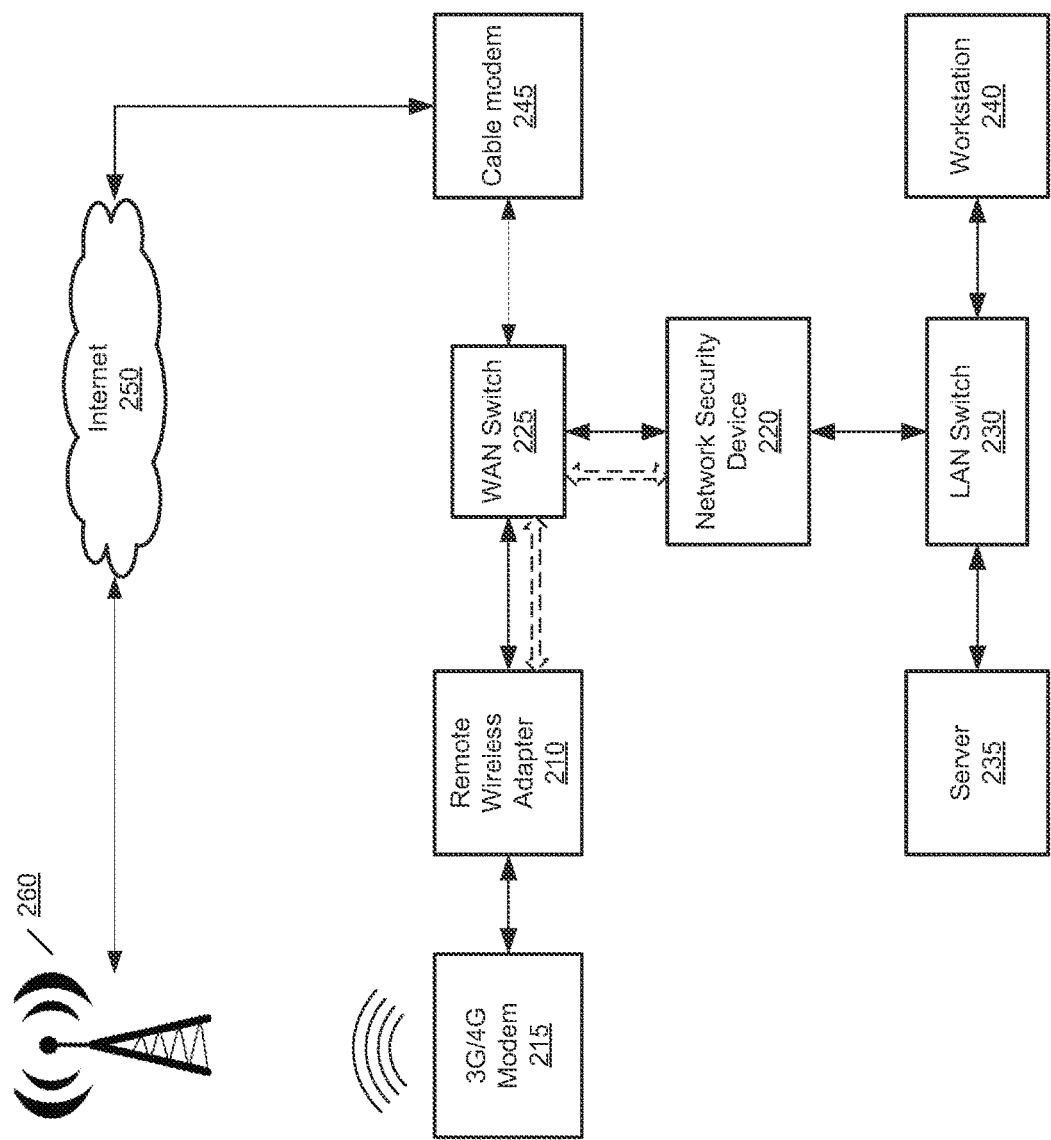
FIG. 2A illustrates an exemplary network architecture with wireless failover connections in accordance with an embodiment of the present invention.

FIG. 2A illustrates an exemplary network architecture with wireless failover connections in accordance with an embodiment of the present invention. In this embodiment, network security device 220 connects to LAN switch 230. Internal network appliances, such as server 235 and workstation 240 are connected to network security device 220 through LAN switch 230. Network security device 220 controls the traffic of internal network appliances based on its security policies and protects the internal network appliances from outside attacks. Network security device 220 also connects to WAN switch 225. WAN switch 225 connects to cable modem 245 which connects to the Internet 250. The connection through cable modem 245 is the primary Internet connection of network security device 220. Remote wireless adapter 210 connects to network security device 220 through WAN switch 225. This is a failover connection of network security device 220. When the primary Internet connection is unavailable for some reason, network security device 220 forwards outgoing data packets to remote wireless adapter 210 through a tunnel (shown in dotted lines) between network security device 220 and remote wireless adapter 210. The outgoing data packets are then transferred to 3G/4G modem 215 which is connected to or embedded within remote wireless adapter 210. 3G/4G modem 215 then transmits the outgoing data packets to base station 260 of a cellular network through air interface. The incoming data packets received by the 3G/4G modem 215 are forwarded by remote wireless adapter 210 to network security device 220 through the tunnel.

Figure 2B:
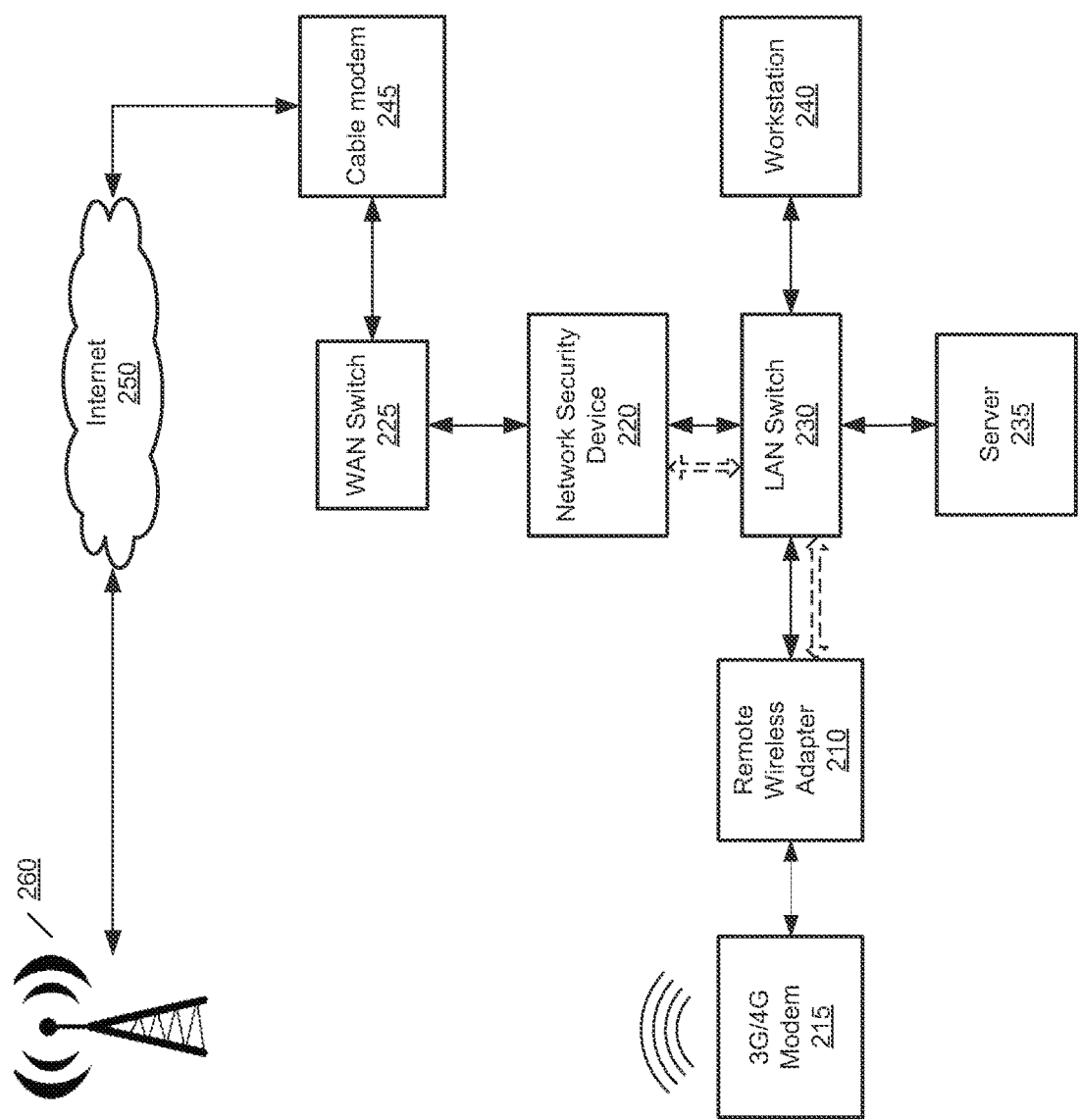
FIG. 2B illustrates another exemplary network architecture with wireless failover connections in accordance with an embodiment of the present invention.

FIG. 2B illustrates another exemplary network architecture with wireless failover connections in accordance with an embodiment of the present invention. Functions and connections of units in FIG. 2B are the same as that of FIG. 2A except that remote wireless adapter 210 connects to LAN switch 230 instead of workstation 240. A tunnel is also setup between network security device 220 and remote wireless adapter 210. The outgoing data packets from network security device 220 are transmitted to remote wireless adapter 210 through the tunnel and incoming data packets from 3G/4G modem 215 are forwarded to network security device 220 through the tunnel. In this embodiment, remote wireless adapter 210 connects to LAN switch 230 of network security device 220 even though remote wireless adapter 210 is a router of network security device 220 because outgoing and incoming data packets are transferred between network security device 220 and remote wireless adapter 210 through the tunnel and the tunnel hides the network conditions between network security device 220 and remote wireless adapter 210.

As shown in FIGS. 2A and 2B, remote wireless adapter 210 may be placed anywhere within the internal network or even across the Internet as long as it can setup a tunnel with network security device 220. Although remote wireless adapter 210 is described herein as providing a failover connection, it is to be understood that it may also operate as a primary Internet connection.

Figure 3:
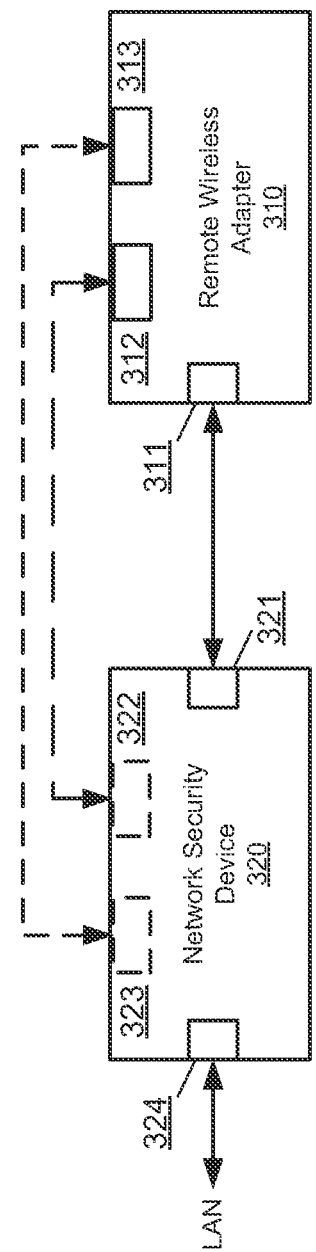
FIG. 3 is a block diagram illustrating interfaces and connections of a network security device and a remote wireless adapter in accordance with an embodiment of the present invention.

FIG. 3 is a block diagram illustrating interfaces and connections of a network security device 320 and a remote wireless adapter 310 in accordance with an embodiment of the present invention. In this embodiment, remote wireless adapter 310 has WAN interfaces 312 and 313. WAN interfaces 312 and 313 may be USB 3G/4G modems that are inserted into the USB ports of remote wireless adapter 310. Alternatively, 3G/4G modems may be integral to remote wireless adapter 310.

WAN interfaces 312 and 313 may be assigned public IP addresses and other network parameters by an ISP when remote wireless adapter 310 dials up the 3G/4G modems to connect a cellular network. LAN port 311 is used for connecting remote wireless adapter 310 to network security device 320. Remote wireless adapter 310 may connect directly to LAN or WAN port 321 of network security device 320 by a cable. It is also possible that remote wireless adapter 310 connects indirectly to network security device 320 across LANs by switches or even the Internet. LAN port 311 may be a Power over Ethernet (PoE) port that can provide power to remote wireless adapter 310.

After a tunnel is established between remote wireless adapter 310 and network security device 320, network security device 320 receives the public IP addresses and other network parameters assigned to WAN interfaces 312 and 313 of remote wireless adapter 310 through the tunnel. Virtual WAN interfaces 322 and 323 are setup at network security device 320 based on the public IP address and other network parameters of WAN interfaces 312 and 313. Each virtual WAN interface of network security device 320 corresponds to a WAN interface of remote wireless adapter 310. When an outgoing data packet is received from LAN interface 324, network security device 320 writes the outgoing data packet to virtual WAN interface 322 or 323. Then, the data packet is forwarded to the remote wireless adapter 310 though the tunnel (shown in dotted lines). After remote wireless adapter 310 receives the outgoing data packet, remote wireless adapter 310 writes the data packet to the corresponding WAN interface and the data packet is sent to the Internet by the 3G/4G modem. Incoming data packets received by the 3G/4G modem of remote wireless adapter 310 are transferred to Virtual WAN interfaces 322 or 323 through the tunnel. Then, network security device 320 routes the incoming data packets to corresponding LAN interface 324. Network security device 320 may setup security policies for virtual WAN interfaces 322 and 323 so that all the data packets will be scanned before they are transferred to/from the internal network.

Figure 4:
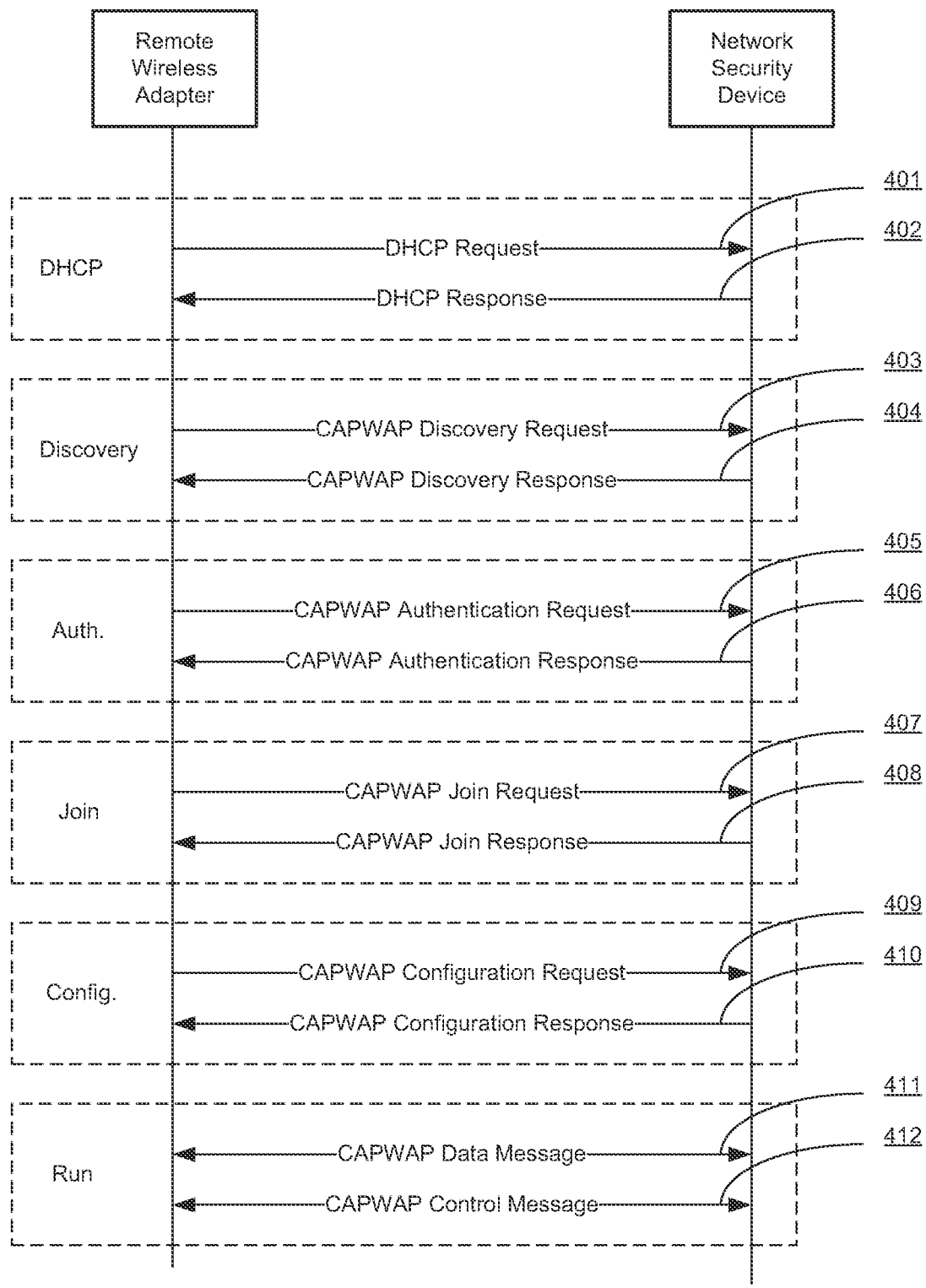
FIG. 4 is a sequence chart illustrating the interactions between a remote wireless adapter and a network security device in accordance with an embodiment of the present invention.

FIG. 4 is a sequence chart illustrating the interactions between a remote wireless adapter and a network security device in accordance with an embodiment of the present invention. In this embodiment, a remote wireless adapter connects to a network security device directly and a private IP address is assigned to the remote wireless adapter by the network security device. Other connection modes are described below in connection with other embodiments. The operations shown in this embodiment is based on Control And Provisioning of Wireless Access Points (CAPWAP) protocol and a CAPWAP tunnel is setup between the remote wireless adapter and the network security device. However, it is understood that the tunnel is used for establishing a connection between the remote wireless adapter and the network security device so that network conditions are hidden and data packets may be transferred in a safe manner. Other protocols, such as Datagram Transport Layer Security (DTLS), Secure Socket Layer (SSL), may also be used for setting up the tunnel.

At step 401, the remote wireless adapter initiates a DHCP request to the network security device. Then, at step 402, the DHCP server of the network security device sends a DHCP response to the remote wireless adapter.

In the network structure shown in FIG. 1, remote wireless adapter 110 connects to WAN port 121 of network security device 120 and operates as a router of network security device 120. Remote wireless adapter 110 has an internal DHCP server while network security device 120 has a DHCP client. When remote wireless adapter 110 is connected with network security device 120, the DHCP client of network security device 120 initiates a DHCP request. The internal DHCP server of remote wireless adapter 110 assigns a private IP address and other network parameters to network security device 120 in a DHCP response. The network security device then assign the private IP address and other network parameters to its WAN port. When an outgoing data packet is received by the network security device, it is sent to the WAN port.

In contrast to the example shown in FIG. 1, according to the present example, the remote wireless adapter has a DHCP client and the network security device has a DHCP server. Since the remote wireless adapter may request an IP address from the DHCP server of the network security device or another DHCP server, this allows the remote wireless adapter to be located anywhere in the network to which the network security device is connected. The DHCP procedure will be described in further detail below with reference to FIG. 5.

In step 403, the remote wireless adapter initiates a CAPWAP discovery request. This may be a standard step of CAPWAP. The CAPWAP discovery request is used for establishing an initial CAPWAP connection between the remote wireless adapter and the network security device. CAPWAP discovery request messages may be sent by the remote wireless adapter in the discover state after waiting for a random delay less than a max discovery interval, after the remote wireless adapter first comes up or is initialized. This is to prevent an explosion of CAPWAP discovery request messages. If a CAPWAP discovery response message is not received after sending the maximum number of CAPWAP discovery request messages, the remote wireless adapter enters a Sulking state and waits for an interval equal to a silent interval before sending further CAPWAP discovery request messages.

In step 404, upon receiving a CAPWAP discovery request message, the network security device responds with a CAPWAP discovery response message sent to the address in the source address of the received CAPWAP discovery request message. Once a CAPWAP discovery response is received, if the remote wireless adapter decides to establish a session with the responding network security device, it may perform an MTU discovery to obtain information regarding the maximum supported packet size.

In step 405, a CAPWAP authentication request is sent by the remote wireless adapter. Responsive thereto, in step 406, a CAPWAP authentication response is sent by the network security device. The authentication processing is used to setup a Datagram Transport Layer Security (DTLS) connection so that data packets between the network security device and the remote wireless adapter are encrypted and transmitted in a secure manner.

As shown in FIG. 1, remote wireless adapter 110 of the prior art connects to network security device 120 directly. As such, it is not necessary to encrypt data packets exchanged between remote wireless adapter 110 and network security device 120. In accordance with embodiments of the present invention; however, the remote wireless adapter may connect to the network security device across different networks and it is preferable that original data packets be encrypted by the remote wireless adapter or the network security device before sending to the other peer. The details of a CAPWAP authentication procedure are described in further detail below with reference to FIG. 6.

In step 407, a CAPWAP join request is sent by the remote wireless adapter and a CAPWAP join response is sent by the network security device in step 408. The join processing is used by the remote wireless adapter to request service from the network security device after a DTLS connection is established with the network security device. The details of a CAPWAP join procedure are described in further detail below with reference to FIG. 7.

In step 409, a CAPWAP configuration request is sent by the remote wireless adapter and a CAPWAP configuration response is sent by the network security device in step 410. In the configuration processing, the remote wireless adapter and network security device exchange configuration information through the already established CAPWAP tunnel. The details of a CAPWAP configuration procedure are described in further detail below with reference to FIG. 8.

In step 411, CAPWAP data messages are transmitted between the remote wireless adapter and the network security device and CAPWAP control messages are transmitted between the remote wireless adapter and network security device in step 412. When an outgoing data packet needs to be sent out through remote wireless adapter, the network security device sends the outgoing data packet as a data message through the tunnel and the remote wireless adapter sends the outgoing data packet to the Internet through its 3G/4G modem. When an incoming data packet is received by the 3G/4G modem of the remote wireless adapter, it is transmitted to the network security device as a data message through the tunnel. Some control messages may also transmitted between the network security device and the remote wireless adapter. The details of data and control transmission between the network security device and the remote wireless adapter are described in further detail below with reference to FIGS. 9-11.

Figure 5:
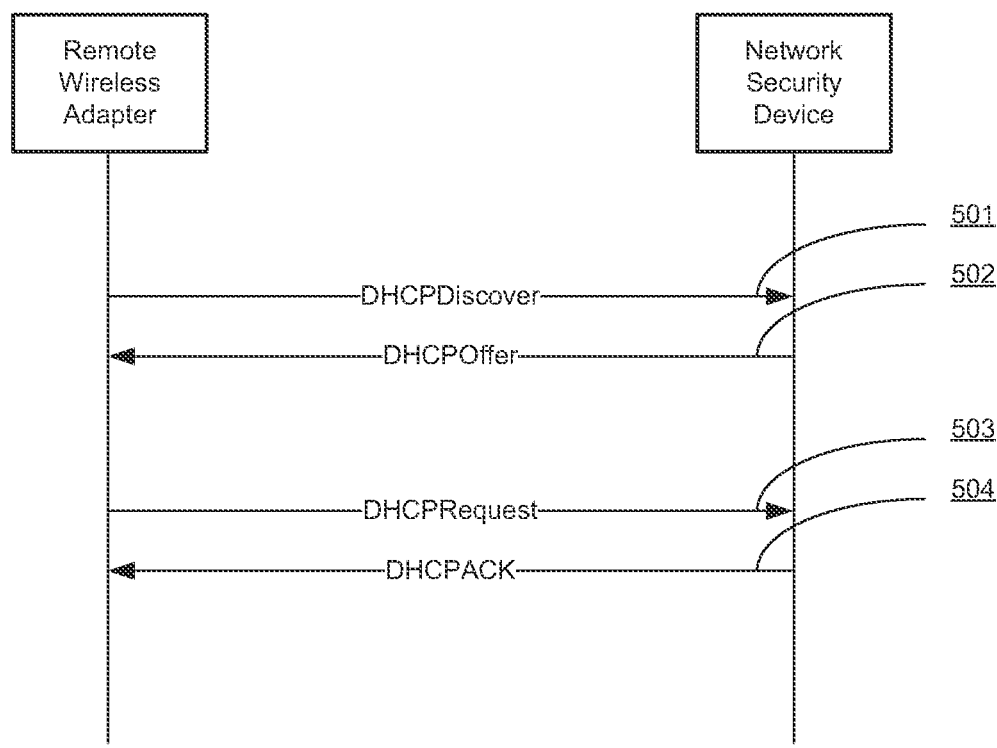
FIG. 5 is a sequence chart illustrating DHCP processing between a remote wireless adapter and a network security device in accordance with an embodiment of the present invention.

FIG. 5 is a sequence chart illustrating DHCP processing between a remote wireless adapter and a network security device in accordance with an embodiment of the present invention. In this embodiment, a DHCP client is embedded in the remote wireless adapter and a DHCP server is embedded in the network security device. The DHCP processing may be standard DHCP processing through which the remote wireless adapter is assigned a private IP address by the network security device. The remote wireless adapter can connect with the network security device directly or indirectly (with one or more switches logically interposed there between). All layer 3 communications between remote wireless adapter and network security device will use the assigned private IP address. According to the present example, the DHCP processing is as follows.

In step 501, remote wireless adapter broadcasts a DHCP-Discover request together with its Media Access Control (MAC) address on the network to which the remote wireless adapter is connected.

In step 502, the network security device, which provides a DHCP server, receives the DHCPDiscover request and sends a DHCPOffer. In the DHCPOffer, the network security device sends back an unused IP address within the network to the remote wireless adapter and a list of DHCP configuration parameters.

In step 503, the remote wireless adapter accepts the IP address allocated in the DHCPOffer and sends a DHCPRequest to confirm the previously allocated IP address.

In step 504, the network security device sends back DHCPAck to confirm the IP address selected by the remote wireless adapter.

Although the DHCP server is within the network security device and DHCP messages are sent by the network security device in this embodiment, it is understood that a DHCP server may not reside within the network security device. The DHCP processing is used for the remote wireless adapter to receive the necessary IP configuration so that the remote wireless adapter and the network security device may be connected though a network. The DHCP server may be separate from the network security device and may even be located in different LAN.

Figure 6:
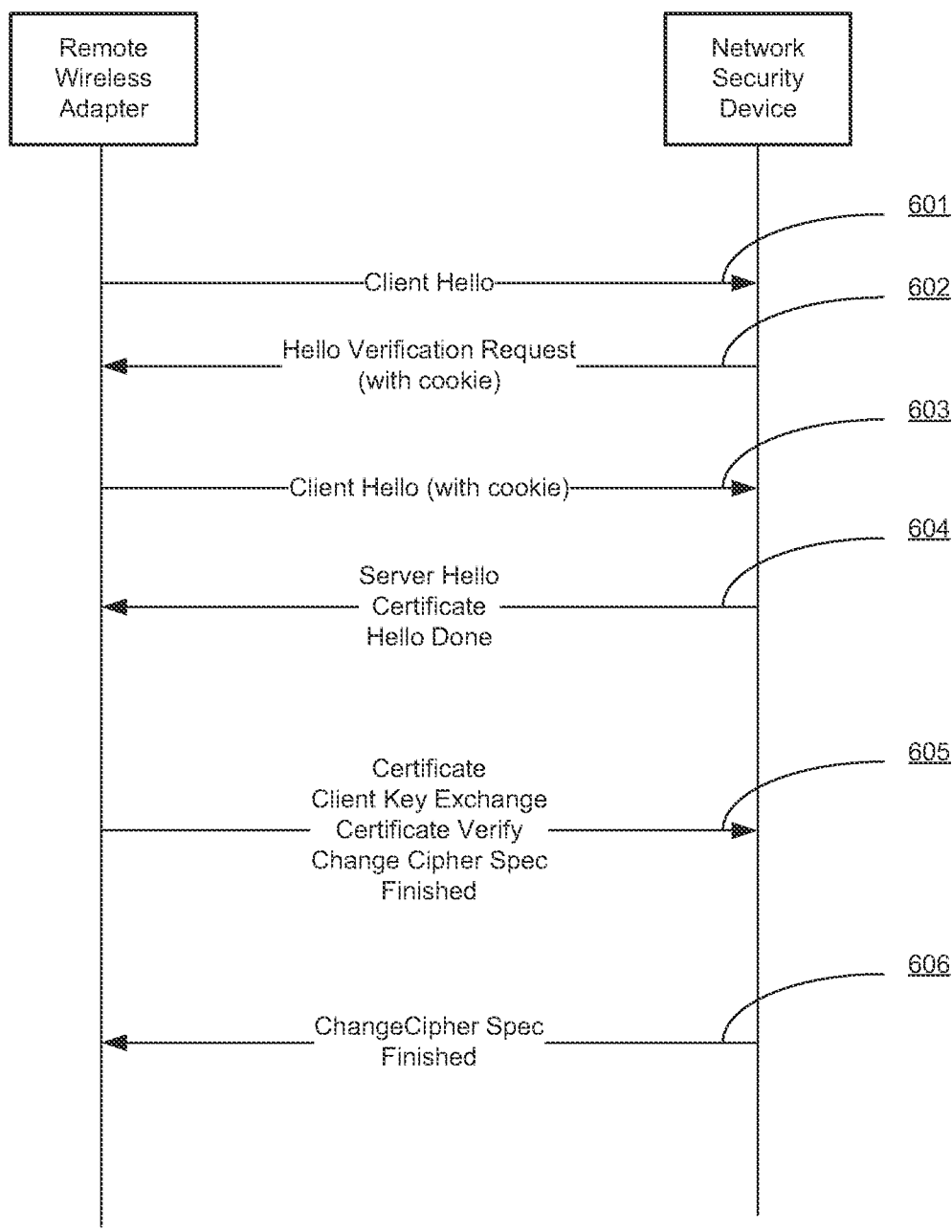
FIG. 6 is a sequence chart illustrating authentication processing between a remote wireless adapter and a network security device in accordance with an embodiment of the present invention.

FIG. 6 is a sequence chart illustrating authentication processing between a remote wireless adapter and a network security device in accordance with an embodiment of the present invention. In this embodiment, the remote wireless adapter and the network security device perform a CAPWAP standard authentication and the remote wireless adapter uses a DTLS handshake to make the authentication with network security device. During this process, an authenticated connection between the remote wireless adapter and the network security device will be set up. In one embodiment, one or more virtual WAN interfaces are created on the network security device corresponding to one or more WAN interfaces of the remote wireless adapter.

In step 601, the remote wireless adapter first sends a ClientHello message to initiate a handshake, indicating its list of cryptographic algorithms, compression method, newest protocol version and potentially other parameters. Because the network security device and the remote wireless adapter may work in different LANs or WANs, it is desirable to protect the communication messages between them. In the present embodiment, DTLS is used for encrypting the control messages and data between the remote wireless adapter and the network security device. In this manner, it is very difficult to intercept and steal the information between the remote wireless adapter and the network security device even they are connected across various networks. The cryptographic algorithms used in the DTLS may be authenticated with certificates or authenticated with pre-shared keys. CAPWAP implementations may use cipher suites that are recommended for use with DTLS. The following algorithms may be supported when using certificates for CAPWAP authentication:

TLS_RSA_WITH_AES_128_CBC_SHA [RFC5246]
TLS_DHE_RSA_WITH_AES_128_CBC_SHA [RFC5246]
TLS_RSA_WITH_AES_256_CBC_SHA [RFC5246]
TLS_DHE_RSA_WITH_AES_256_CBC_SHA [RFC5246]

Several methods for authenticating with pre-shared keys are defined [RFC4279], and the following may be used in the present embodiment:

Pre-Shared Key (PSK) key exchange algorithm
DHE_PSK key exchange algorithm
TLS_PSK_WITH_AES_128_CBC_SHA [RFC5246]
TLS_DHE_PSK_WITH_AES_128_CBC_SHA [RFC5246]
TLS_PSK_WITH_AES_256_CBC_SHA [RFC5246]
TLS_DHE_PSK_WITH_AES_256_CBC_SHA [RFC5246]

In step 602, upon receiving the ClientHello message, the network security device replies with a HelloVerifyRequest message with a cookie to the remote wireless adapter.

In step 603, the remote wireless adapter retransmits the ClientHello message with the cookie added to it.

In step 604, upon receiving the ClientHello message with the cookie, the network security device verifies the cookie. If the cookie is correct, then the remote wireless adapter and the network security device establish the handshake process. The network security device sends back a ServerHello message, including the server's already selected connection parameters, which were provided by the remote wireless adapter at the first ClientHello message, and the communication algorithms needed in the process. Then, the network security device sends its certificate, including its identity and public key to the remote wireless adapter.

In step 605, upon cipher suite negotiation and certificate validation, the remote wireless adapter sends the ClientKeyExchange followed by the ChangeCipherSpec record protocol. ChangeCipherSpec notifies the other party that all subsequent records will be encrypted by the just-negotiated ciphers and key material.

In step 606, the network security device responds with a ChangeCipherSpec, which means that from now on, records sent in both directions are encrypted. The DTLS session is now fully established.

Figure 7:
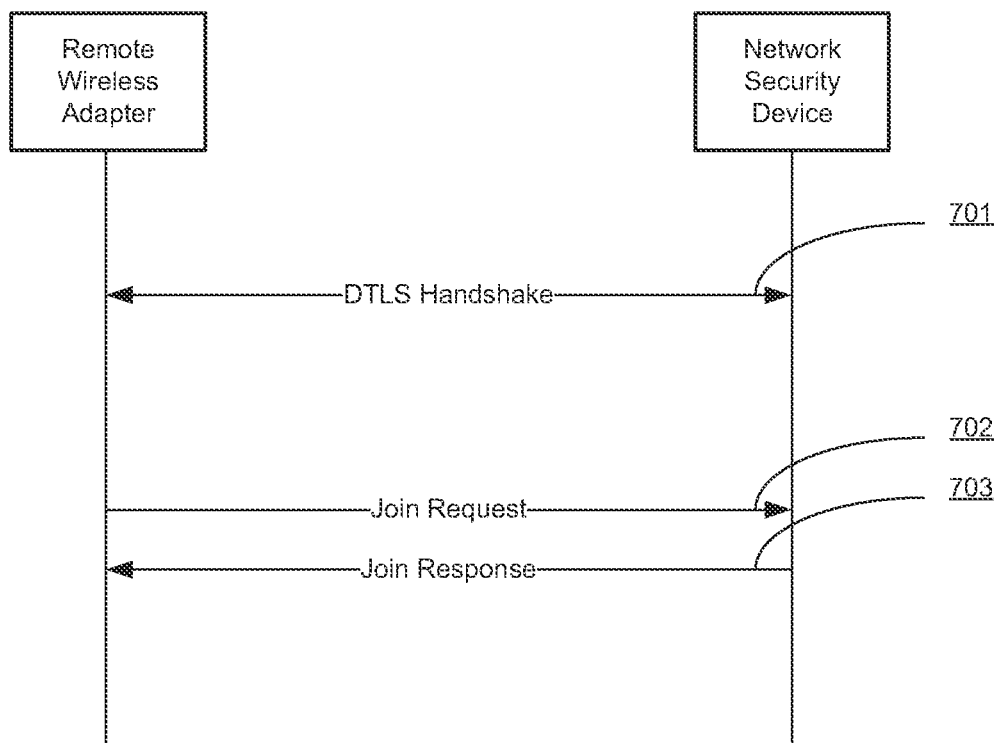
FIG. 7 is a sequence chart illustrating join processing between a remote wireless adapter and a network security device in accordance with an embodiment of the present invention.

FIG. 7 is a sequence chart illustrating join processing between a remote wireless adapter and a network security device in accordance with an embodiment of the present invention. The join processing is used by the remote wireless adapter to request service from the network security device after a DTLS connection is established with the network security device.

Upon completion of the DTLS handshake 701 and receipt of a DTLS Established notification, the remote wireless adapter sends a Join Request message to the network security device at step 702.

Figure 8:
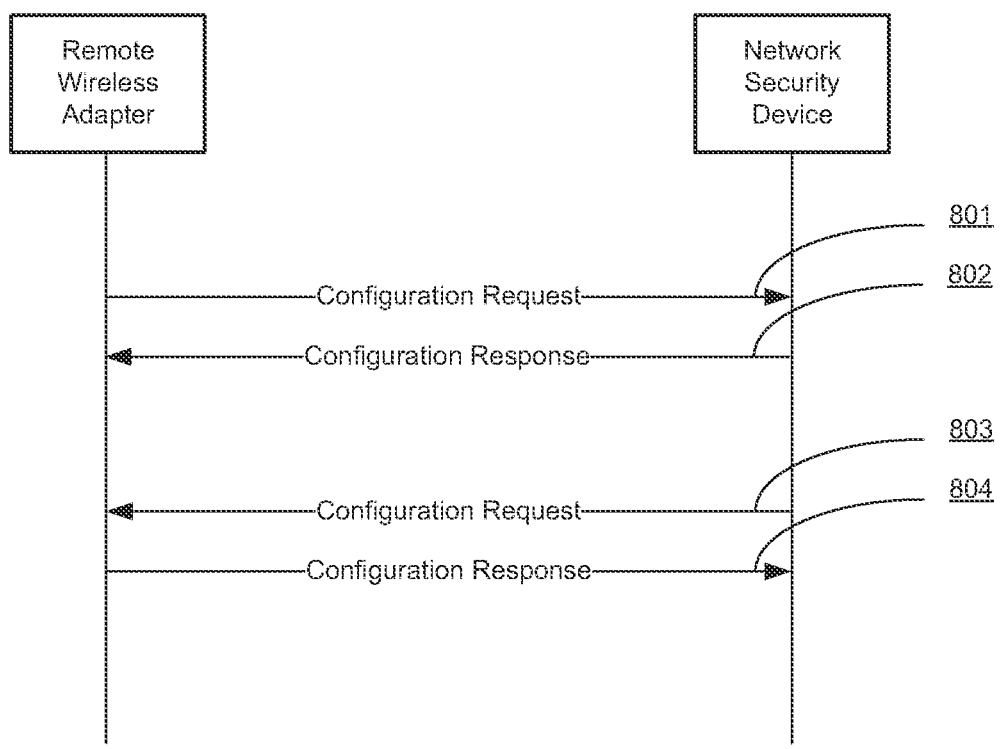
FIG. 8 is a sequence chart illustrating configuration processing between a remote wireless adapter and a network security device in accordance with an embodiment of the present invention.

In step 703, the network security device sends a Join Response message to the remote wireless adapter, indicating success or failure. If the network security device allows the remote wireless adapter to join the network security device, it sends a Join Response with a success indication. If the network security device rejects the Join Request, it sends a Join Response message with a failure indication and initiates an abort of the DTLS session via the DTLS Abort command. If an invalid Join Request message is received, the message is silently discarded by the network security device and no response is sent to the remote wireless adapter FIG. 8 is a sequence chart illustrating configuration processing between a remote wireless adapter and a network security device in accordance with an embodiment of the present invention. In this processing, the remote wireless adapter and network security device exchange configuration information through the already established CAPWAP tunnel.

After a successful Join Response message is received, the remote wireless adapter determines whether the included Image Identifier message element is the same as the currently running image. If so, the remote wireless adapter transmits the Configuration Status Request message to the network security device with message elements describing its current configuration in step 801.

On the network security device's part, when it receives the Configuration Status Request message from the remote wireless adapter, which may include specific message elements to override the remote wireless adapter's configuration, the network security device stops the WaitJoin timer. The network security device transmits the Configuration Status Response message in step 802. The network security device checks if the images on the remote wireless adapter are compatible with the network security device. If the image can't work with the network security device's version, a new image will be pushed to remote wireless adapter.

In step 803, the network security device sends a "Configuration Request" to the remote wireless adapter, including all the parameters that need to be updated.

In step 804, after the remote wireless adapter receives the request, the remote wireless adapter tries to overwrite its own parameters based on those contained within the Configuration Request. Then, the remote wireless adapter sends a "Configuration Response" to inform the network security device whether the configuration exchange status was successful.

After the tunnel between the remote wireless adapter and the network security device is established, both the network security device side and remote wireless adapter side run a CAPWAP process. According to one embodiment, all data and control messages between the network security device and the remote wireless adapter are encrypted and transferred as UDP payload between these two processes. The traffic flow between the remote wireless adapter and the network security device will be described in further detail below with reference to FIGS. 9-11.

Figure 9:
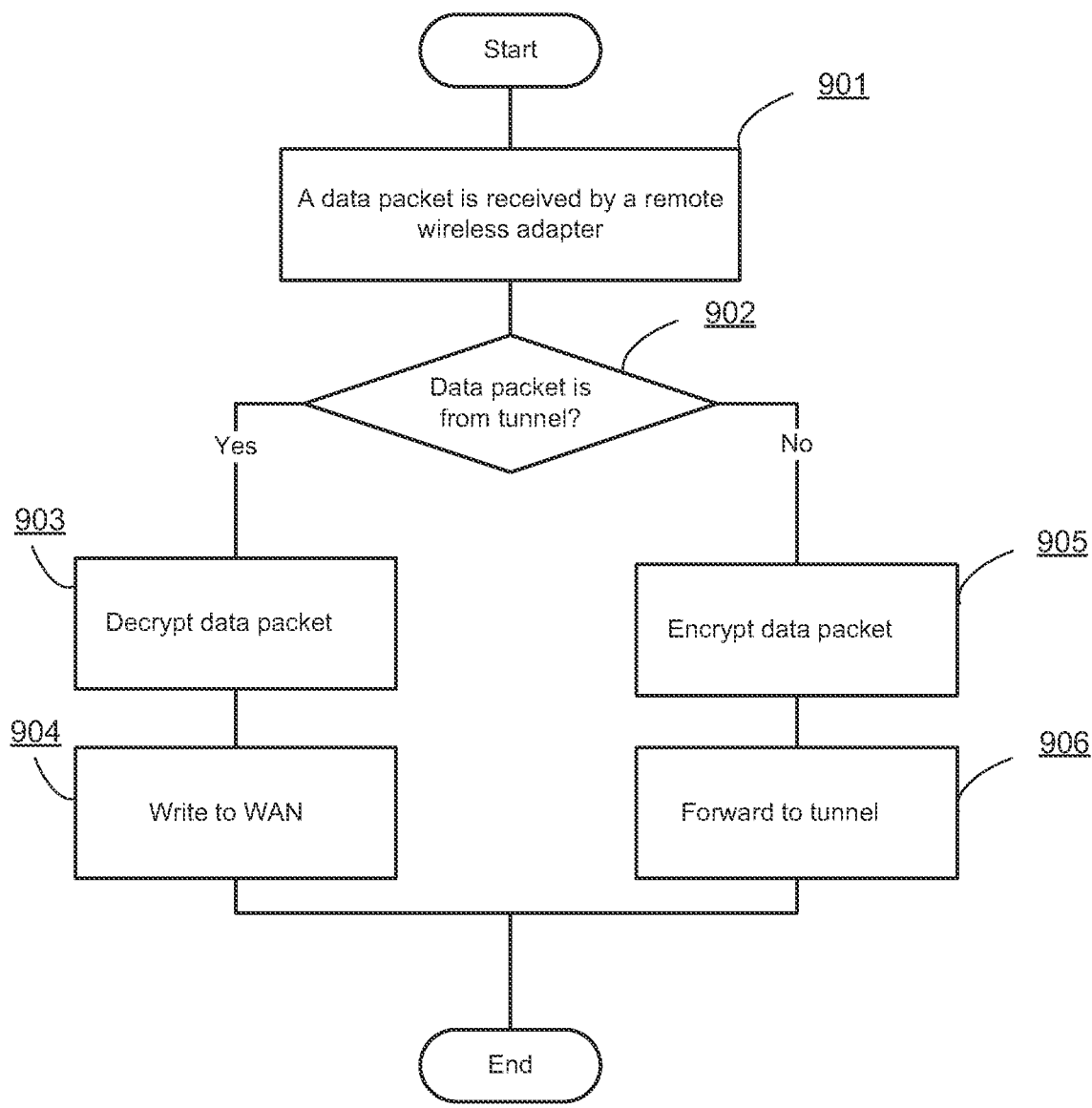
FIG. 9 is a flow chart illustrating data processing performed by a remote wireless adapter in accordance with an embodiment of the present invention.

FIG. 9 is a flow chart illustrating data processing performed by a remote wireless adapter in accordance with an embodiment of the present invention.

At block 901, a data packet is received by the remote wireless adapter.

At decision block 902, the remote wireless adapter determines if the data packet is from the tunnel between the network security device and the remote wireless adapter. If so, then processing for this outbound data packet continues with block 903; otherwise, processing branches to block 905 to process the inbound data packet.

At block 903, the encrypted data packet received from the network security device via the tunnel is decrypted based on the algorithm negotiated with the network security device.

At block 904, the original data packet (after decryption) is written to the 3G/4G modem of the remote wireless adapter. The data packet is then sent to the cellular network through the air interface by the 3G/4G modem. At this point, data packet processing is complete.

At block 905, it has been determined, at decision block 902, that the data packet is not from the tunnel. Therefore, the data packet is known to be an incoming data packet that has been received by the 3G/4G modem of the remote wireless adapter. As such, the data packet is encrypted based on the algorithm negotiated with the network security device.

At block 906, the encrypted data packet is forwarded to the network security device through the tunnel. At this point, incoming data packet processing is complete.

Figure 10:
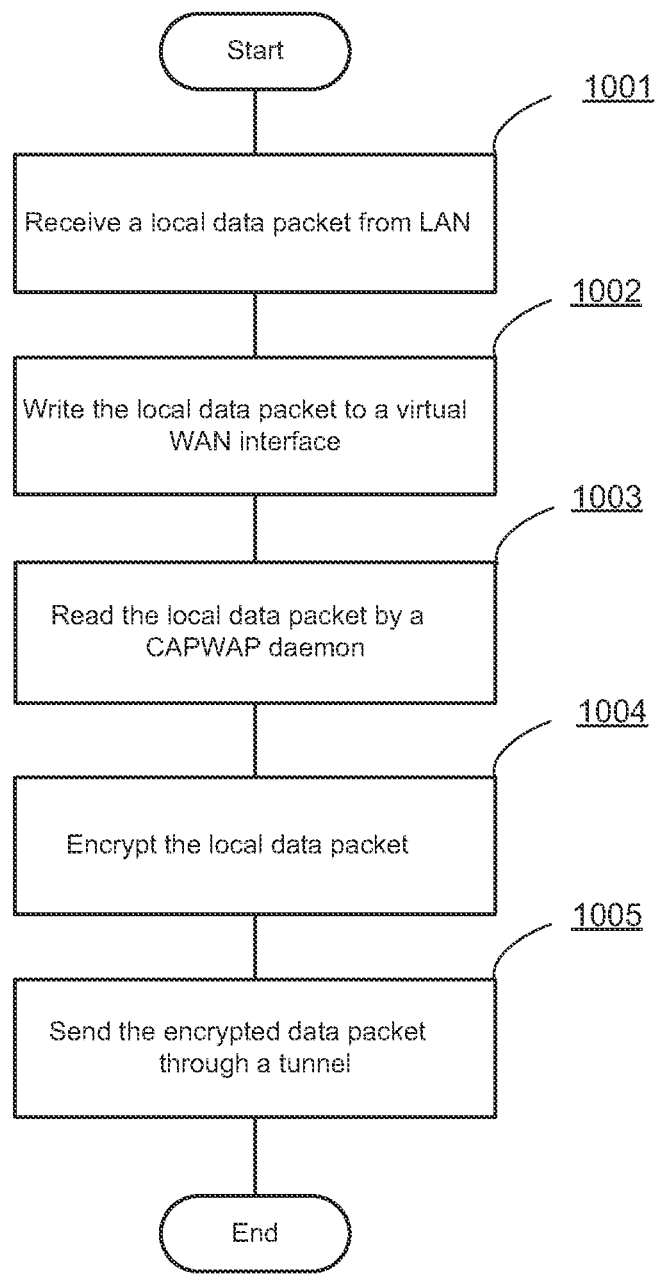
FIG. 10 is a flow chart illustrating outgoing data packet processing of a network security device in accordance with an embodiment of the present invention.

FIG. 10 is a flow chart illustrating outgoing data packet processing of a network security device in accordance with an embodiment of the present invention. For purposes of this example, it is assumed the primary connection to the Internet is down and outbound data packets are to be forwarded to their intended destination via the remote wireless adapter.

In step 1001, the network security device receives an outgoing data packet from its LAN port. The outgoing data packet is from a network appliance that is connected to the private network controlled by the network security device and is to be sent to the Internet through the remote wireless adapter.

In step 1002, according to network address translation (NAT) and routing lookup of the network security device, the outgoing data packet is written to a virtual WAN interface that corresponding to a 3G/4G modem of the remote wireless adapter.

In step 1003, a CAPWAP daemon that is listening on the virtual WAN interface reads in the outgoing data packet.

In step 1004, the CAPWAP daemon encrypts the data packet based on the authentication connection information negotiated with the remote wireless adapter.

In step 1005, the encrypted data packet is sent out through the tunnel to the remote wireless adapter. According to one embodiment, the encrypted data packet is handled by the remote wireless adapter as described with reference to FIG. 9.

Figure 11:
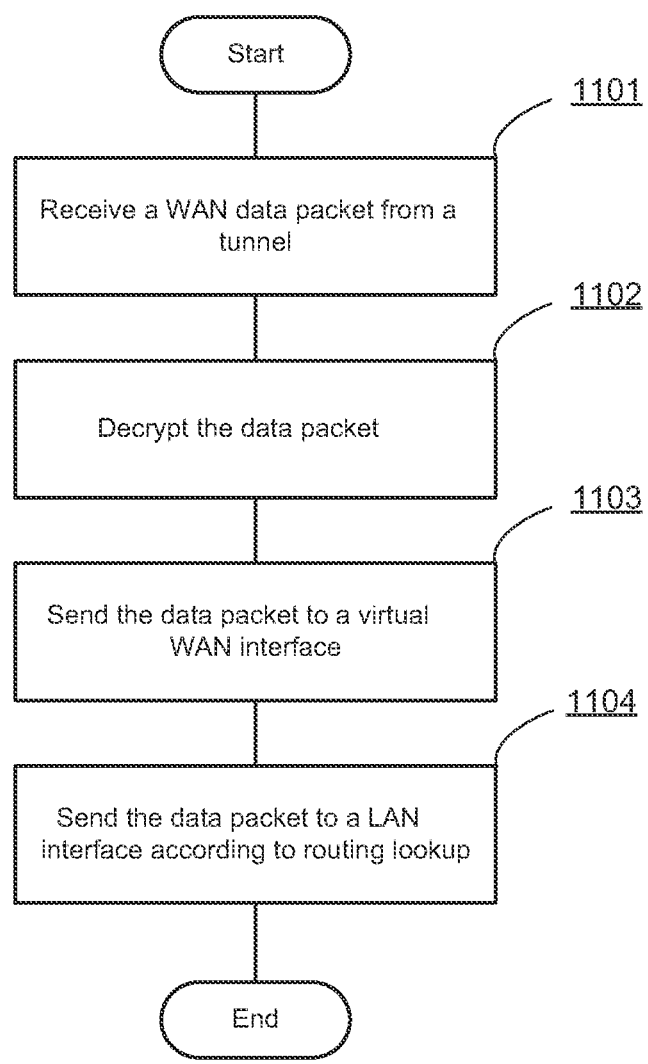
FIG. 11 is a flow chart illustrating WAN data packet processing of a network security device in accordance with an embodiment of the present invention.

FIG. 11 is a flow chart illustrating WAN data packet processing of a network security device after a data packet is received by a remote wireless adapter from the Internet and is forwarded to the network security device through the tunnel. For purposes of this example, it is assumed the primary connection to the Internet is down and inbound data packets are received via the tunnel between the network security device and the remote wireless adapter.

In step 1101, a CAPWAP daemon of the network security device receives an incoming data packet from the tunnel connecting the network security device and the remote wireless adapter. According to one embodiment, the incoming data packet is encrypted before it is sent by the remote wireless adapter through the tunnel.

In step 1102, the CAPWAP daemon decrypts the incoming data packet to recover the original WAN data packet based on the authentication connection information negotiated with the remote wireless adapter.

In step 1003, the original WAN data packet is written to a virtual WAN interface of the network security device.

In step 1004, the virtual WAN interface sends the original WAN data packet to a LAN interface according to network address translation (NAT) and routing lookup performed by the network security device.

Figure 12:
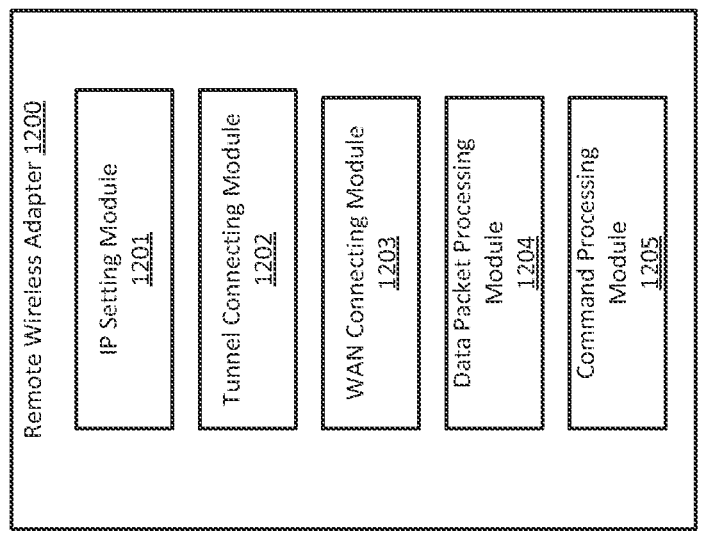
FIG. 12 illustrates exemplary functional units of a remote wireless adapter in accordance with an embodiment of the present invention.

FIG. 12 illustrates exemplary functional units of a remote wireless adapter 1200 in accordance with an embodiment of the present invention. In the present example, remote wireless adapter 1200 comprises an IP setting module 1201, a tunnel connecting module 1202, a WAN connecting module 1203, a data packet processing module 1204 and a command processing module 1205.

IP setting module 1201 is used for configuring IP settings of remote wireless adapter 1200. In one embodiment, IP setting module 1201 is a DHCP client that requests for a lease of an IP address and other settings from a DHCP server when the remote wireless adapter is connected to a network. The DHCP server may be located within or outside a network security device that controls remote wireless adapter 1200. In another embodiment, IP setting module 1201 may be configured to use a static IP address and other network parameters that are assigned by the manufacture of remote wireless adapter 1200. If a static IP address and other parameters are configured properly by the manufacture, remote wireless adapter 1200 needs no configuration from the user and can be used immediately by connecting it anywhere within the network.

Tunnel connecting module 1202 is configured to establish a tunnel between remote wireless adapter 1200 and the network security device. After remote wireless adapter 1200 is connected to the network, tunnel connecting module 1202 negotiates with a network security device so that a secure connection, which may be across one or more network segments, is established. Data messages and control messages may be encrypted and exchanged between remote wireless adapter 1200 and the network security device. In one embodiment, a CAPWAP tunnel is used because remote wireless adapter 1200 may work similar to a wireless access point and the network security device may control and communicate with remote wireless adapter 1200 through the CAPWAP tunnel. It is understood that other tunneling protocols may also be used if they can hide the network conditions and provide a secure path over different networks to the payload between remote wireless adapter 1200 and the network security device. Exemplary alternative tunneling protocols include, but are not limited to SSL, secure shell (SSH) or even proprietary protocols. Remote wireless adapter 1200 can work not only in the same LAN as the network security device, but also can work in different LANs or WANs. Remote wireless adapter 1200 may be located anywhere as long as it can connect with the network security device through a network. For example, the user of remote wireless adapter 1200 may setup remote wireless adapter 1200 at a place where the 3G/4G signal is strong and connect remote wireless adapter 1200 to any port of a network. For a company with a large office or poor signal strength where the network security device is located, remote wireless adapter 1200 can be deployed with great flexibility and provide better network performance.

WAN connecting module 1203 is configured to control the WAN connection that is established by one or more 3G/4G modems of remote wireless adapter 1200. WAN connecting module 1203 may start the 3G/4G modems when outgoing traffic is received from the tunnel or stop the 3G/4G modem when no data packets have been received for a predetermined time period. WAN connecting module 1203 may also adjust the parameters of the 3G/4G modem, such as the transmission speed, after receiving a control message from the network security device. If the 3G/4G modem is a USB 3G/4G modem, WAN connecting module 1203 may monitor the event that a USB 3G/4G modem is inserted into a USB port of the wireless adapter. Then, WAN connecting module 1203 switches the USB 3G/4G modem to USB modem mode and dials up through the USB wireless modem to setup the WAN connection with a cellular network through it air interface.

Data packet processing module 1204 of remote wireless adapter 1200 is configured to control the traffic between the tunnel and the 3G/4G modem. If an outgoing data packet is received from the tunnel between the remote wireless adapter and the network security device, the outgoing data packet is decrypted to its original data packet by data packet processing module 1204 based on the algorithm negotiated with the network security device when the tunnel is setup. The original data packet is written to the 3G/4G modem and then sent to the cellular network through its air interface. If a data packet is received from the cellular network by the 3G/4G modem, data packet processing module 1204 encrypts the data packet and sends it to the network security device through the tunnel.

Command processing module 1205 is used for receiving commands that are sent by the network security device though control messages of the tunnel. The commands may be start/stop a particular 3G/4G modem of the remote wireless adapter or configure parameters of a 3G/4G modem, such as speed of the 3G/4G modem or login information etc. System logs of remote wireless adapter 1200 may also be sent to the network security device through control messages of the tunnel.

Figure 13:
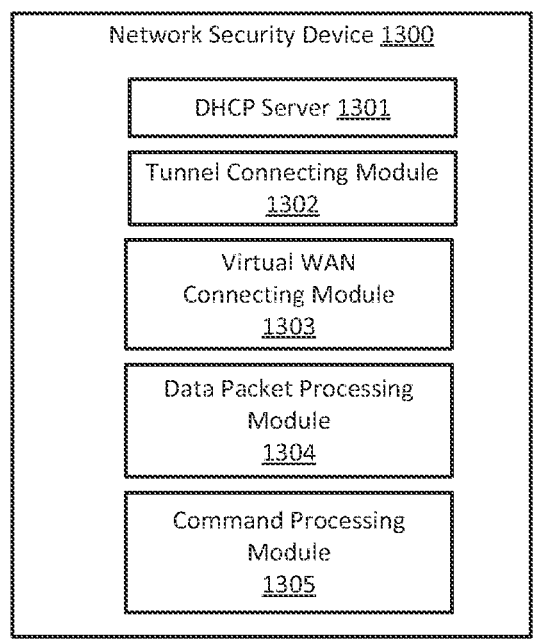
FIG. 13 illustrates exemplary functional units of a network security device in accordance with an embodiment of the present invention.

FIG. 13 illustrates exemplary functional units of a network security device 1300 in accordance with an embodiment of the present invention. According to the present example, network security device 1300 may include a DHCP server 1301, a tunnel connecting module 1302, a virtual WAN module 1303, a data packet processing module 1304 and a command processing module 1305. DHCP server 1301 is configured to assign an IP address and other IP parameters to a remote wireless adapter when the remote wireless adapter is connected to the network.

Tunnel connecting module 1302 is configured to establish a tunnel between network security device 1300 and a remote wireless adapter. After a remote wireless adapter is connected to the network, tunnel connecting module 1302 negotiates with the remote wireless adapter to establish a secure connection, which may be across one or more network segments. Data messages and control messages may be encrypted and exchanged between network security device 1300 and the remote wireless adapter.

Virtual WAN module 1303 is configured to setup a map to a 3G/4G modem of the remote wireless adapter that is connected to network security device 1300 through the tunnel. When network security device 1300 receives an outgoing data packet from its LAN port, the outgoing data packet is forwarded to a virtual WAN interface of Virtual WAN module 1303 after NAT and routing lookup. When an incoming data packet is received by a 3G/4G modem of a remote wireless adapter and is forwarded to network security device 1300 through the tunnel, network security device 1300 writes the incoming data packet to the corresponding virtual WAN interface.

Data packet processing module 1304 is configured to control the traffic between the tunnel and the virtual WAN interface of network security device 1300. If a data packet is received from the tunnel between the remote wireless adapter and network security device 1300, the data packet is decrypted to recover the original data packet by data packet processing module 1304 based on the algorithm negotiated with the remote wireless adapter when the tunnel was initially setup. The original data packet is written to the virtual WAN interface and is sent to a LAN port after NAT and routing lookup by the TCP/IP stack. If an outgoing data packet is received from a virtual WAN interface, data packet processing module 1304 encrypts the outgoing data packet and sends the encrypted data packet to the remote wireless adapter through the tunnel.

Command processing module 1305 is configured to control one or more remote wireless adapters at network security device 1300. As CAPWAP protocol provides secure transmission of both data messages and control messages through a tunnel, network security device 1300 may use central management to control all the remote wireless adapters to which it is connected. The command processing module 1305 may provide a command line interface (CLI) or a graphic user interface (GUI) for the network administrator to configure any one of the remote wireless adapters through the tunnel between network security device 1300 and the remote wireless adapter. The control messages may includes control commands sent by network security device 1300 and state information returned by the remote wireless adapter, such as:

1. Enable/Disable WAN interface of the remote wireless adapter;
2. USB/internal 3G/4G modem parameter settings of the remote wireless adapter;
3. USB/internal 3G/4G modem signal show;
4. USB modem contact and detach event;
5. Accept public IP address assigned from ISP service pushed from the remote wireless adapter;
6. System log messages from the remote wireless adapter.

In embodiments of the present invention, network security device 1300 may do the entire configuration of every remote wireless adapter no matter where it is located in the network. Network security device 1300 knows the entire distribution of all the remote wireless adapters and may configure them uniformly. Network security device 1300 may also keep all the log files received from the remote wireless adapter(s). If any error occurs, the administrator may use the log files to determine the cause and take action to resolve the problem.

Figure 14:
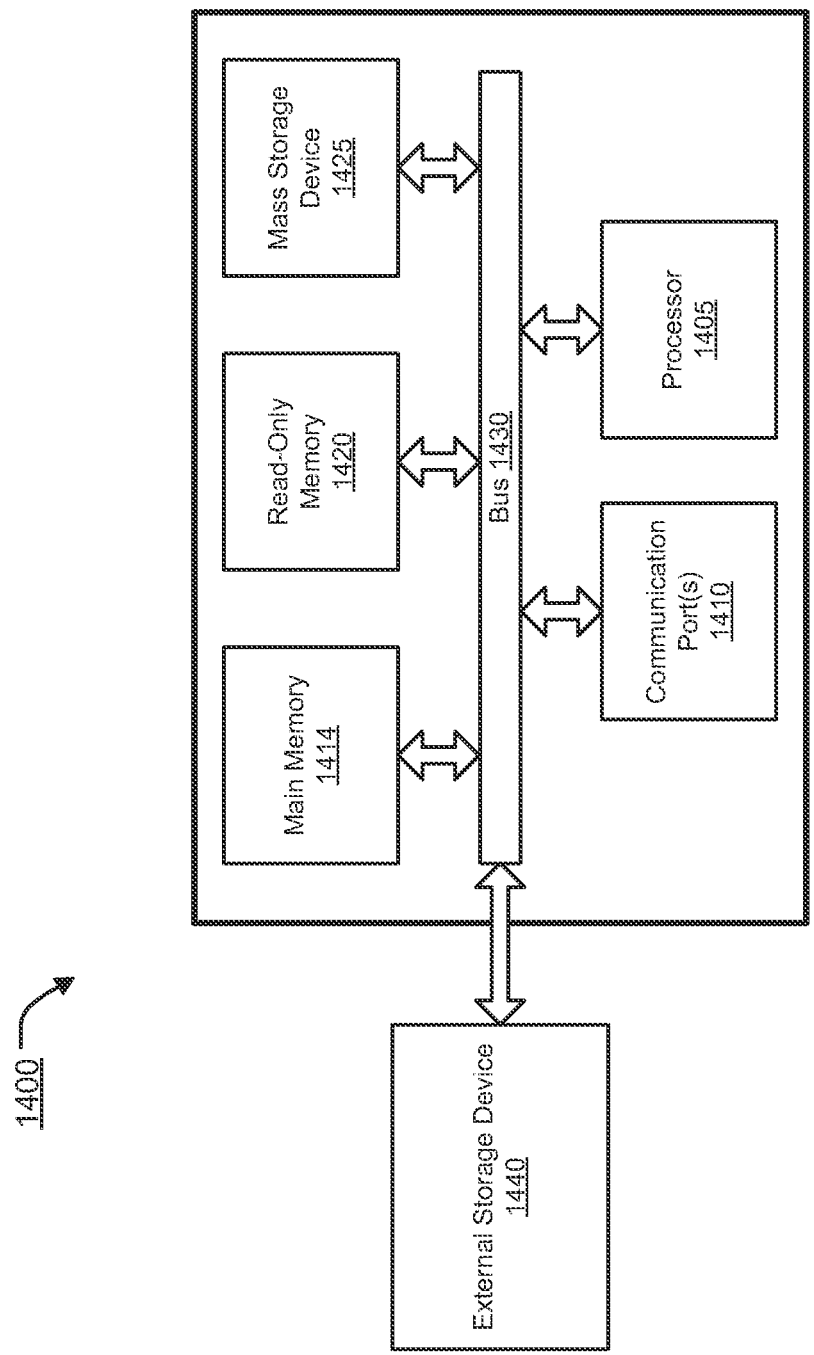
FIG. 14 illustrates an exemplary computer system in which or with which embodiments of the present invention may be utilized.

FIG. 14 is an example of a computer system 1400 with which embodiments of the present disclosure may be utilized. Computer system 1400 may represent or form a part of a network security device, a remote wireless adapter, a server or a client workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 1400 includes a bus 1430, a processor 1405, communication port 1410, a main memory 1415, a removable storage media 1440, a read only memory 1420 and a mass storage 1425. A person skilled in the art will appreciate that computer system 1400 may include more than one processor and communication ports.

Examples of processor 1405 include, but are not limited to, an Intel® Itanium® or Itanium 2 processor(s), or AMDC® Opteron® or Athlon MP® processor(s), Motorola® lines of processors, FortiSOC™ system on a chip processors or other future processors. Processor 1405 may include various modules associated with units as described in FIGS. 12 and 13.

Communication port 1410 can be any of an RS-232 port for use with a modem based dialup connection, a 10/100 Ethernet port, a Gigabit or 10 Gigabit port using copper or fiber, a serial port, a parallel port, or other existing or future ports. Communication port 1410 may be chosen depending on a network, such a Local Area Network (LAN), Wide Area Network (WAN), or any network to which computer system 1400 connects.

Memory 1415 can be Random Access Memory (RAM), or any other dynamic storage device commonly known in the art. Read only memory 1420 can be any static storage device(s) such as, but not limited to, a Programmable Read Only Memory (PROM) chips for storing static information such as start-up or BIOS instructions for processor 1405.

Mass storage 1425 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1430 communicatively couples processor(s) 1405 with the other memory, storage and communication blocks. Bus 1430 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1405 to system memory.

Optionally, operator and administrative interfaces, such as a display, keyboard, and a cursor control device, may also be coupled to bus 1430 to support direct operator interaction with computer system 1400. Other operator and administrative interfaces can be provided through network connections connected through communication port 1410.

Removable storage media 1440 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   facilitating independence between a physical location of a remote wireless adapter associated with a private network and a physical location of a network security device associated with the private network by implementing within the remote wireless adapter a Dynamic Host Configuration Protocol (DHCP) client;
   sending, by the DHCP client, a DHCP request to a DHCP server implemented within the network security device;
   receiving, by DHCP client, DHCP configuration parameters, including a private Internet Protocol (IP) address assigned to the remote wireless adapter by the network security device; and
   configuring a local area network (LAN) adapter of the remote wireless adapter based on the DHCP configuration parameters;
   setting up a tunnel between the remote wireless adapter and the network security device;
   setting up a wide area network (WAN) connection, by the remote wireless adapter, through a wireless modem associated with the remote wireless adapter;
   receiving, by the remote wireless adapter, via the tunnel an outgoing data packet sent by the network security device;
   writing, by the remote wireless adapter, the outgoing data packet to the WAN connection;
   receiving, by the remote wireless adapter, an incoming data packet through the WAN connection; and
   forwarding, by the remote wireless adapter, the incoming data packet to the network security device through the tunnel.

2. The method of claim 1, wherein the tunnel comprises a Control And Provisioning of Wireless Access Points (CAPWAP) communication tunnel.

3. The method of claim 1, further comprising:
   decrypting the outgoing data packet before writing the outgoing data packet to the WAN connection based on an algorithm negotiated with the network security device; and
   encrypting the incoming data packet before forwarding the incoming data packet to the tunnel based on the algorithm negotiated with the network security device.

4. The method of claim 1, further comprising:
   receiving, by the remote wireless adapter, a control command from the network security device through the tunnel; and
   controlling the wireless modem according the control command.

5. The method of claim 1, wherein said setting up WAN connection further comprises:
   detecting that a Universal Serial Bus (USB) wireless modem is inserted into a USB port of the remote wireless adapter;
   switching the USB wireless modem to USB modem mode;
   dialing up through the USB wireless modem to setup the WAN connection.

6. The method of claim 2, further comprising:
   sending, by the remote wireless adapter, a CAPWAP discovery request to the network security device;
   receiving, by the remote wireless adapter, a CAPWAP discovery response from the network security device;
   sending, by the remote wireless adapter, a CAPWAP authentication request to the network security device;
   receiving, by the remote wireless adapter, a CAPWAP authentication response from the network security device;
   sending, by the remote wireless adapter, a CAPWAP join request to the network security device;
   receiving, by the remote wireless adapter, a CAPWAP join response from the network security device;
   exchanging, by the remote wireless adapter, configuration information with the network security device; and
   configuring the remote wireless adapter and the wireless modem based on configuration information received from the network security device.

7. A method, comprising:
   facilitating independence between a physical location of a remote wireless adapter associated with a private network and a physical location of a network security device associated with the private network by implementing within the network security device a Dynamic Host Configuration Protocol (DHCP) server;
   receiving, by the DHCP server, a DHCP request from a DHCP client implemented within the remote wireless adapter; and
   causing, by the DHCP server, the remote wireless adapter to configure a local area network (LAN) adapter of the remote wireless adapter by sending to the DHCP client DHCP configuration parameters, including a private Internet Protocol (IP) address assigned to the remote wireless adapter by the network security device; and
   setting up a tunnel between the network security device and the remote wireless adapter, wherein the remote wireless adapter is connected to a cellular network through a wireless modem;
   receiving, by the network security device, an outgoing data packet from a local network appliance;
   forwarding, by the network security device, the outgoing data packet to the remote wireless adapter through the tunnel;

receiving, by the network security device, an incoming data packet through the tunnel; and routing, by the network security device, the incoming data packet to a local area network (LAN) interface based on a routing lookup.

8. The method of claim 7, wherein the tunnel comprises a Control And Provisioning of Wireless Access Points (CAPWAP) communication tunnel.

9. The method of claim 7, further comprising:
receiving, by the network security device, a public IP address of the remote wireless adapter; and
setting up a virtual WAN interface, by the network security device using the public IP address of the remote wireless adapter.

10. The method of claim 7, further comprising:
encrypting the outgoing data packet before forwarding the outgoing data packet to the tunnel based on an algorithm negotiated with the remote wireless adapter; and
decrypting the incoming data packet before routing the incoming data packet to the LAN adapter based on an algorithm negotiated with the remote wireless adapter.

11. The method of claim 7, further comprising:
sending, by the network security device, a control command to the remote wireless adapter through the tunnel; and
receiving, by the network security device, state information of the remote wireless adapter through the tunnel.

12. The method of claim 8, further comprising:
receiving, by the network security device, a CAPWAP discovery request from the remote wireless adapter;
sending, by the network security device, a CAPWAP discovery response to the remote wireless adapter;
receiving, by the network security device, a CAPWAP authentication request from the remote wireless adapter;
sending, by the network security device, a CAPWAP authentication response to the remote wireless adapter;
receiving, by the network security device, a CAPWAP join request from the remote wireless adapter;
sending, by the network security device, a CAPWAP join response to the remote wireless adapter;
exchanging, by the network security device, configuration information with the remote wireless adapter.

13. The method of claim 9, further comprising:
writing, by the network security device, the outgoing data packet from the local network appliance to the virtual WAN interface; and
sending, by the network security device, the outgoing data packet via the tunnel to the remote wireless adapter.

14. The method of claim 9, further comprising:
writing, by the network security device, the incoming data packet received from the tunnel to the virtual WAN interface; and
sending, by the network security device, the incoming data packet to the LAN interface according to the routing lookup.

15. A system comprising:
a non-transitory storage device having embodied therein one or more routines implementing a remote wireless adapter and a Dynamic Host Configuration Protocol (DHCP) client; and
one or more processors coupled to the non-transitory storage device and operable to execute the one or more routines to perform a method comprising:
facilitating independence between a physical location of the system within a private network and a physical location of a network security device associated with the private network by configuring the remote wireless adapter based on DHCP configuration parameters provided by the network security device, including:
sending, by the DHCP client, a DHCP request to a DHCP server implemented within the network security device;
receiving, by DHCP client, the DHCP configuration parameters, including a private Internet Protocol (IP) address assigned to the remote wireless adapter by the network security device; and
configuring a local area network (LAN) adapter of the remote wireless adapter based on the DHCP configuration parameters;
setting up a tunnel between the remote wireless adapter and the network security device;
setting up a wide area network (WAN) connection, by the remote wireless adapter, through a wireless modem which is connected to the remote wireless adapter;
receiving, by the remote wireless adapter, an outgoing data packet sent by the network security device through the tunnel;
writing, by the remote wireless adapter, the outgoing data packet to the WAN connection;
receiving, by the remote wireless adapter, an incoming data packet through the WAN connection; and
forwarding, by the remote wireless adapter, the incoming data packet to the network security device through the tunnel.

16. The system of claim 15, wherein the tunnel comprises a Control And Provisioning of Wireless Access Points (CAPWAP) communication tunnel.

17. The system of claim 15, wherein the method further comprises:
decrypting the outgoing data packet before writing the outgoing data packet to the WAN connection based on an algorithm negotiated with the network security device; and
encrypting the incoming data packet before forwarding the incoming data packet to the tunnel based on the algorithm negotiated with the network security device.

18. The system of claim 15, wherein the method further comprises:
receiving, by the remote wireless adapter, a control command from the network security device through the tunnel; and
controlling the wireless modem according the control command.

19. The system of claim 15, wherein said setting up a WAN connection further comprises:
detecting that a Universal Serial Bus (USB) wireless modem is inserted into a USB port of the remote wireless adapter;
switching the USB wireless modem to USB modem mode;
dialing up through the USB wireless modem to setup the WAN connection.

20. The system of claim 16, wherein the method further comprises:
sending, by the remote wireless adapter, a CAPWAP discovery request to the network security device;
receiving, by the remote wireless adapter, a CAPWAP discovery response from the network security device;
sending, by the remote wireless adapter, a CAPWAP authentication request to the network security device;
receiving, by the remote wireless adapter, a CAPWAP authentication response from the network security device;

sending, by the remote wireless adapter, a CAPWAP join request to the network security device;

receiving, by the remote wireless adapter, a CAPWAP join response from the network security device;

exchanging, by the remote wireless adapter, configuration information with the network security device; and configuring the remote wireless adapter and the wireless modem based on configuration information received from the network security device.

21. A system comprising:

a non-transitory storage device having embodied therein one or more routines implementing a network security device and a Dynamic Host Configuration Protocol (DHCP) server; and one or more processors coupled to the non-transitory storage device and operable to execute the one or more routines to perform a method comprising:

facilitating independence between a physical location of the system within a private network and a physical location of a remote wireless adapter associated with the private network by causing the remote wireless adapter to be configured based on DHCP configuration parameters provided by the network security device, including:

receiving, by the DHCP server, a DHCP request from a DHCP client implemented within the remote wireless adapter; and causing, by the DHCP server, the remote wireless adapter to configure a local area network (LAN) adapter of the remote wireless adapter by sending to the DHCP client DHCP configuration parameters, including a private Internet Protocol (IP) address assigned to the remote wireless adapter by the network security device; and setting up a tunnel between the network security device and the remote wireless adapter, wherein the remote wireless adapter is connected to a cellular network through a wireless modem;

receiving, by the network security device, an outgoing data packet from a local network appliance;

forwarding, by the network security device, the outgoing data packet to the remote wireless adapter through the tunnel;

receiving, by the network security device, an incoming data packet through the tunnel; and routing, by the network security device, the incoming data packet to a local area network (LAN) interface based on its routing lookup.

22. The system of claim 21, wherein the tunnel comprises a Control And Provisioning of Wireless Access Points (CAPWAP) communication tunnel.

23. The system of claim 21, wherein the method further comprises:

receiving, by the network security device, a public IP address of the remote wireless adapter; and setting up a virtual WAN interface, by the network security device using the public IP address of the remote wireless adapter.

24. The system of claim 21, wherein the method further comprises:

encrypting the outgoing data packet before forwarding the outgoing data packet to the tunnel based on an algorithm negotiated with the remote wireless adapter; and decrypting the incoming data packet before routing the incoming data packet to the LAN adapter based on an algorithm negotiated with the remote wireless adapter.

25. The system of claim 21, wherein the method further comprises:

sending, by the network security device, a control command to the remote wireless adapter through the tunnel; and receiving, by the network security device, state information of the remote wireless adapter through the tunnel.

26. The system of claim 22, wherein the method further comprises:

receiving, by the network security device, a CAPWAP discovery request from the remote wireless adapter;

sending, by the network security device, a CAPWAP discovery response to the remote wireless adapter;

receiving, by the network security device, a CAPWAP authentication request from the remote wireless adapter;

sending, by the network security device, a CAPWAP authentication response to the remote wireless adapter;

receiving, by the network security device, a CAPWAP join request from the remote wireless adapter;

sending, by the network security device, a CAPWAP join response to the remote wireless adapter;

exchanging, by the network security device, configuration information with the remote wireless adapter.

27. The system of claim 23, wherein the method further comprises:

writing, by the network security device, the outgoing data packet from the local network appliance to the virtual WAN interface; and sending, by the network security device, the outgoing data packet via the tunnel to the remote wireless adapter.

28. The system of claim 23, wherein the method further comprises:

writing, by the network security device, the incoming data packet received from the tunnel to the virtual WAN interface; and sending, by the network security device, the incoming data packet to the LAN interface according to the routing lookup.

* * * * *